United States Patent
Luryi et al.

(10) Patent No.: US 7,643,718 B2
(45) Date of Patent: Jan. 5, 2010

(54) PHOTONIC WAVEGUIDE DEVICE FOR MODAL CONTROL

(75) Inventors: Serge Luryi, Old Field, NY (US); Arsen V. Subashiev, Centereach, NY (US)

(73) Assignee: Research Foundation of State University of New York, Albany, NY (US)

( * ) Notice: Subject to any disclaimer, the term of this patent is extended or adjusted under 35 U.S.C. 154(b) by 163 days.

(21) Appl. No.: 11/439,614

(22) Filed: May 23, 2006

(65) Prior Publication Data

US 2008/0095494 A1    Apr. 24, 2008

(51) Int. Cl.
*G02B 6/10* (2006.01)
(52) U.S. Cl. .................................. 385/129; 385/131
(58) Field of Classification Search .................. None
See application file for complete search history.

(56) References Cited

U.S. PATENT DOCUMENTS

| | | | | |
|---|---|---|---|---|
| 4,859,013 A | * | 8/1989 | Schmitt et al. ................ | 385/6 |
| 6,804,280 B2 | * | 10/2004 | Shchukin et al. ......... | 372/45.01 |
| 2001/0026659 A1 | * | 10/2001 | Sekine et al. ................ | 385/40 |
| 2003/0103712 A1 | * | 6/2003 | Glebov et al. ................ | 385/14 |
| 2004/0062505 A1 | * | 4/2004 | Sugitatsu et al. ............ | 385/131 |
| 2004/0086249 A1 | * | 5/2004 | Zoorob ....................... | 385/129 |
| 2004/0091224 A1 | * | 5/2004 | Baumberg et al. .......... | 385/129 |
| 2005/0053321 A1 | * | 3/2005 | Lidorikis et al. .............. | 385/15 |
| 2008/0253727 A1 | * | 10/2008 | Wu et al. .................... | 385/131 |

OTHER PUBLICATIONS

S. Illek et al. Codirectionally coupled twin-guide laser diode for broadband electronic wavelength tuning. Electronics Letters 27:24:2207, Nov. 1991.*

* cited by examiner

*Primary Examiner*—Mike Stahl
(74) *Attorney, Agent, or Firm*—Lawrence G. Fridman

(57) ABSTRACT

Uniaxially patterned (UAP) dielectric layers have an optical anisotropy that can be dynamically controlled. In a three-layer optical waveguide structure, the pattern can be included in the core or in a cladding layer. The pattern influences the polarization properties of radiation propagating in the structure. Predicated on the effect are devices such as a polarization-insensitive amplifier, a polarizer, an optically controlled polarization switch, and an optically controlled modal coupler.

13 Claims, 1 Drawing Sheet

United States Patent US 7,643,718 B2

PHOTONIC WAVEGUIDE DEVICE FOR MODAL CONTROL

TECHNICAL FIELD

The invention is concerned with photonic devices and, more particularly, with waveguide layer devices.

BACKGROUND OF THE INVENTION

Waveguide structures with cylindrical air pores forming a two-dimensional (2-D) periodic lattice in a semiconductor material are being studied for photonic bandgap applications such as spontaneous emission control and light confinement in micro-cavities. The studies have stimulated numerous determinations of the photonic crystal (PC) band spectra based on the plane-wave expansion of the electromagnetic field, showing that in the long-wavelength limit the spectrum of electromagnetic waves can be well described in the effective media approximation with an effective dielectric constant corresponding to the results of Maxwell-Garnett theory.

Optical properties of composite structures patterned with cylindrical holes or pores, for a wavelength exceeding the inter-hole spacing, can therefore be described in terms of the fill factor alone, i.e. the fraction of total volume occupied by the pores. The properties do not depend on the long-range order of the holes or their diameter, as the effect of disorder merely amounts to weak Rayleigh scattering. The effective media approach remains valid for very large contrast ratios between semiconductor and pore permittivities, and for arbitrary propagation directions of the electromagnetic waves.

Direct comparison of the calculation results based on three-dimensional (3-D) and 2-D modeling shows that the same approach can be used to describe the wave-guiding properties of multilayered structures that include patterned layers. Moreover, studies of PC-like structures with small disorder show that the Maxwell-Garnett approach remains valid even for wavelengths barely exceeding the hole spacing, so long as the optical frequency is below the lowest photonic bandgap and light scattering remains negligible.

In semiconductor lasers and amplifiers, the propagation of different optical modes is sensitive to various structural parameters such as modal gain, material gain anisotropy and mode confinement factor, giving rise to polarization sensitivity. For example, the typical three-layer waveguide design of semiconductor amplifiers with isotropic constituents results in better confinement of the TE mode and a larger gain for this mode in comparison with the TM mode. To obtain a polarization-insensitive amplifier, one had to use highly anisotropic active layers with a material gain that favors TM polarization.

SUMMARY OF THE INVENTION

For optical waveguide devices, e.g. semiconductor lasers and amplifiers, we have discovered that uniaxially patterned (UAP) dielectric layer regions can be included for modal control, as such regions have an optical anisotropy that can be externally controlled. Among exemplary devices are a polarization-insensitive amplifier, a polarizer, an optically controlled polarization switch, and an optically controlled modal coupler.

DETAILED DESCRIPTION

Figure 1:
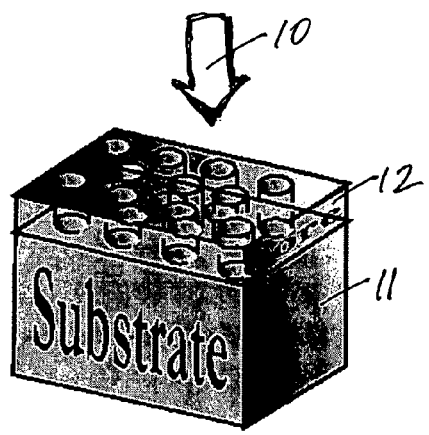
FIG. 1-3 are schematic perspective views, greatly enlarged, of waveguide structures with uniaxially patterned layers in accordance with preferred embodiments of the invention.

FIG. 1 shows a substrate 11, a uniaxially patterned waveguide layer 12, and a source 10 of pump radiation. The pattern is formed by a 2-dimensional hexagonal array of cylindrical pores in the waveguide layer 12. The waveguide layer 12 can be dielectric or semiconducting. Such a structure can be made for monitoring the polarization properties of wave modes traveling in the waveguide layer 12.

Figure 2:
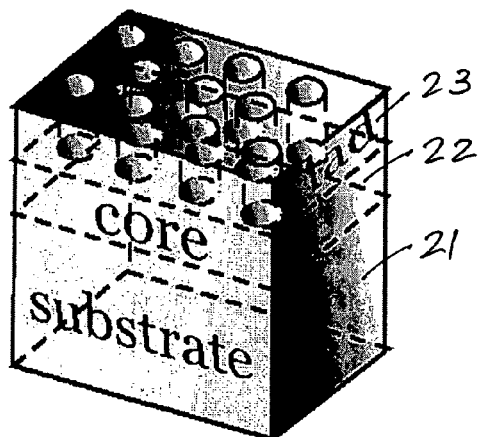

FIG. 2 shows a substrate 21, a waveguide core layer 22, and a uniaxially patterned cladding layer 23. The pattern is formed by a 2-dimensional hexagonal array of cylindrical pores in the cladding layer 23. The substrate 21 and the cladding layer 23 are dielectric, and the waveguide core layer 22 is semiconducting. More generally in such a three-layer planar waveguide structure having a top cladding layer, a guiding core layer and a substrate or bottom cladding layer, each one or any combination of the layers may be uniaxially patterned.

Figure 3:
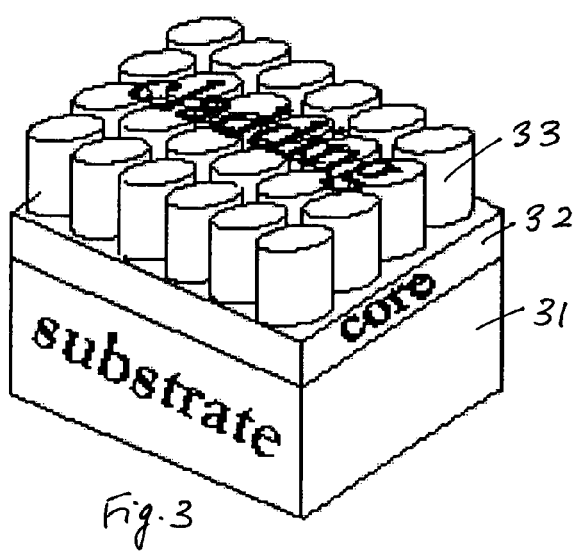

FIG. 3 shows a substrate 31, a waveguide core layer 32 and a uniaxially patterned cladding layer 33 in the form of a 2-dimensional square array of cylindrical rods. The substrate 31 and the cladding layer 33 are dielectric and the core layer 32 is semiconducting.

Figure 4:
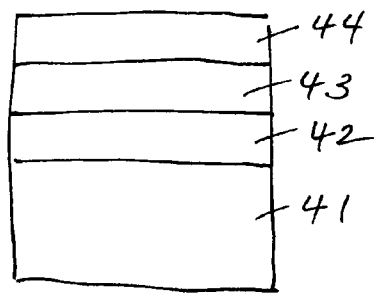
FIGS. 4 and 5 are schematic side views, greatly enlarged, of waveguide structures with uniaxially patterned layers in accordance with further preferred embodiments of the invention.

FIG. 4 shows a substrate 41, a waveguide core layer 42, a uniaxially patterned cladding layer 43 and an additional layer 44 having high refractive index.

Figure 5:
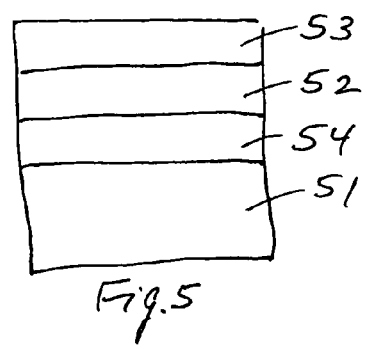

FIG. 5 shows a high-refractive-index layer 54 on a substrate 51, a waveguide core layer 52, and a uniaxially patterned cladding layer 53.

For a three-layer structure according to FIG. 2, for example, when the waveguide core layer 22 is sufficiently thin so as to support only the lowest propagation modes, and with the optical axis of the patterned layers being perpendicular to the waveguide plane as shown, we have determined that the cutoff thicknesses and modal propagation constants are sensitive to the permittivities of the layers and the patterning. Typically, the confinement for the TM mode can be significantly less than that for the TE mode, and small variations of the propagation constants can result in significant changes of the confinement factor modal ratio. This effect can be employed in resulting optical devices, e.g. polarizers and mode-insensitive amplifiers for dynamic operation in real time. For example, dynamically controlled optical pumping of any of the UAP layers 12, 23 and 33 within the absorption band of one of its constituent materials will change the optical contrast of the uniaxial pattern and thus modify both the refractive index of the UAP layer and the modal indices of the waveguide. There results an ultra-fast switch of the modal response in an anisotropy-based cutoff device. Among further applications are mode-dependent leaky waveguides and directional couplers.

Further polarization-dependent effects can be obtained when an additional high-refractive-index layer region, 44 in FIG. 4, is added onto the cladding layer or when the three-layer waveguide is placed on a base-substrate region of high refractive index, 54 in FIG. 5, as the coupling of waveguide modes to the high-index region will have a strong dependence on the matching of modal propagation constants.

For waveguides on a high-index base substrate as shown in FIG. 5, for example, the main effect of the base substrate results from the exponential decay of the guided modes due to their leakage through the bottom cladding layer into the substrate. This leakage has an exponentially strong dependence on the difference between the modal effective index and the index of the bottom cladding layer, which determines the barrier height for photon tunneling decay into the base substrate. In a standard leaky waveguide, the TE mode has a higher index and therefore exponentially lower damping. Including a UAP layer in the structure allows us to alter the bottom cladding-layer modal transparency. This gives a variable selectivity of the leakage-based modal control.

Adding a high-index resonant layer, 44 in FIG. 4, with its thickness chosen to support a mode with the same propagation constant as the basic waveguide leads to an oscillatory energy exchange between the two waveguides. The resonant coupling underlying this exchange is exponentially sensitive to matching of the propagation constants. Inclusion of a UAP layer as a core or cladding layer, combined with the optical pumping, enables a variable-mode vertical directional coupler for fast mode selection in real time.

Though not mandated functionally, commercial device fabrication typically will be of devices with a regular UAP, e.g. square or hexagonal. However, there is further interest in non-uniformity such as gradual variation in the density of pores in a UAP cladding layer. In our limit of very large wavelengths as compared with pore spacing, or at least of wavelengths just greater than pore spacing, the effect is similar to that of lateral index variation in the cladding. It can be used for shaping the mode field in a laser stripe, to achieve desirable properties, similar to those obtained by parabolic etching of the stripe or the parabolic variation of the material refractive index. An example of such properties is one-mode high-power generation in a shaped unstable resonator laser design. It is known that one way of obtaining a large gain difference between the fundamental mode and higher-order modes is to structure profiles with strong real-index antiguiding and weak imaginary-index guiding. Structures with UAP layers can provide very effective antiguiding. In waveguides with a UAP core, the pore density should be highest at the center line. On the other hand, in waveguides with a UAP cladding layer, an antiguiding effect is achieved when the density of pores, and hence the index contrast grow with the distance from the center.

While UAP with lateral variation of pore density are effective for achieving high-power single-mode operation, this approach is suitable for longer-wavelength, e.g. far-infrared devices. One needs room for a smooth but sizable pore density variation while still maintaining pitch less than wavelength.

EXAMPLE 1

Mode Tuning and Polarization-Insensitive Amplifier

We have analyzed an exemplary GaAlAs heterostructure in which a cladding layer is patterned, the structure having a core layer of GaAs on a substrate of $Al_xGa_{1-x}As$ with x=0.17, and with a cladding layer of the same $Al_xGa_{1-x}As$. We have determined that for the TE and TM modes, cutoff thickness of the core layer as well as confinement factor depend on the fill factor of the patterned layer. Specifically for a wavelength $\lambda$=0.86 μm, a core layer thickness d such that 167 nm$\leq$d$\leq$177 nm, and a fill factor f=0.08, the waveguide supports only the lowest TM wave. Similarly, for f$\geq$0.141, there is an interval of core layer thicknesses in which only the TE mode is confined. The reversal of mode confinement may be attributed to a rapid decrease with f of the cladding layer indices for both polarizations, resulting in better confinement of the TE mode at large f, because, in a strongly asymmetric waveguide, anisotropy is of minor importance.

With fill factors in a certain range making for lesser cutoff thickness for the TE mode as compared with TM, there is a region of core layer thicknesses in the same range where both modes are supported, but the TM mode has a tighter confinement. In this region, and subject to other factors such as anisotropy of the material gain and modal dependence of the feedback, conditions allow for the design of a mode-insensitive amplifier.

With ion beam patterning, pore spacing less than or equal to 100 nm and pore diameters less than or equal to 30 nm have been reported as achievable. Parameters of our exemplary structure can be realized with a hexagonal lattice of pores of diameter 40 nm and pitch 134 nm, for example. For such a lattice, the pitch, at about half a wavelength, is comfortably less than the wavelength in the media. Requirements as to the structure parameters are less demanding in the infrared region.

Equal modal confinement can also be obtained when the UAP layer is the core of a symmetric waveguide. We have found that, with a thin active layer, the TM mode can be made competitive if one uses a waveguide with a relatively small index contrast, which makes it more sensitive to core layer anisotropy. The desired low contrast is obtained by a suitable choice of the fill factor of the patterned layer.

EXAMPLE 2

Cutoff Polarizer

In waveguides based on Group III-V heterostructures, the index contrast between core and cladding layers is weak. As a result, the modal competition takes place at small fill factors and for a thin core. The region of competition can be made significantly larger in asymmetric waveguides with suitably chosen compositions in the substrate and cladding layers. For the $Al_xGa_{1-x}As/GaAs/Al_yGa_{1-y}As$ waveguide structure, a smaller Al concentration x in the UAP cladding is preferable as compared with the aluminum concentration y in the substrate. One can then find the fill factor values $f_{TE}$ and $f_{TM}$ for which the waveguide becomes symmetrical for one of the waves. For example, for a waveguide structure with x=0.2 and y=0.7, for a fill factor near f=0.085 and a sufficiently thin active layer, it is found that only the TE mode is confined. Similarly, for a sufficiently thin active layer, for f=0.145 only the TM mode is confined. Thus, with a suitably chosen fill factor and active layer thickness, the structure can be used as a cutoff-based polarizer. For ease of device fabrication as a polarizer, both core and cladding layers may be patterned.

EXAMPLE 3

Dominant Lasing Mode in Highly Asymmetric Structures

A structure with air as cladding and a UAP semiconductor core layer of silicon on a silicon nitride dielectric substrate, it was found that for f$\geq$0.54 the TM mode has a smaller cutoff thickness, and there is a wide range of thicknesses where the waveguide will support only the lowest TM mode. In strongly asymmetric waveguide structures, at large f, the TM mode has better confinement and larger modal index. For values near f=0.53, both modes have a similar confinement factor in a broad range of active layer thickness. It is noted that the values of the confinement factor are generally reduced due to core layer porosity.

EXAMPLE 4

Polarization Switch

Under high illumination, the photo-induced concentration of free electrons in the core and/or cladding layers can be large enough for a significant change of the permittivity, resulting in a change of the modal confinement in a UAP waveguide. Using materials with a short carrier lifetime, both the rise time and the recovery time can be very short, thus providing ultrafast, all-optical modal control. Switching of polarization can be most easily achieved with patterned cladding structures when the optical excitation energy is above the absorption edge of the cladding layer but below the absorption edge of the substrate layer. In this case, optical pumping will result in a significant change of the asymmetry factors for the two modes.

For an asymmetric InGaAsP waveguide operating at a wavelength $\lambda=1.55$ μm with core layer index n=3.55, substrate layer index $n_s=3.24$, UAP cladding layer index $n_c=3.45$, and pump excitation above the cladding bandgap of $\lambda=1.35$ μm, the resulting variation of waveguide characteristics can be described by taking the dielectric function of the absorbing core and cladding layers with the Drude contribution of free carriers.

A linear decrease of the dielectric function of the core and cladding layers with the free carrier concentration alters the waveguide characteristics for the two modes. It was found that the core layer thickness can be chosen such that, for any pumping level, only one or the other of the TE and TM modes will be confined. For pumping corresponding to a free carrier concentration of about $8.5 \times 10^{18}/cm^3$, the device will switch from TM to TE. This effect can be used for both polarization switching and modulation. The switching concentration is sensitive to layer indices and can be adjusted to lower values. For the purpose of low-power switching it is preferable to have cladding and core layers patterned both, for increased anisotropy of the structure and a sharper free-carrier effect on wave propagation, resulting in a reduction of switching concentration.

Excitation levels required to achieve high electronic concentration may lead to heating that changes the refractive indices of the layers. Such thermal effects may become important and should be controlled in the interest of maintaining response time. A further effect of electronic concentration is a buildup of the imaginary part of the dielectric constant of the layers. This effect is only a small correction when index guiding is operative.

We claim:

1. A non-photonic band gap device, comprising:
 a waveguide layer structure which comprises a uniaxially patterned region formed with a two-dimension array of inclusions or pores defined by at least typical distances between neighboring inclusions in the array, said waveguide layer structure comprises a core layer interposed between top and bottom cladding layers, at least one of said core and cladding layers consists of a semiconductor material, said array of inclusions interacts with electromagnetic radiation having different modes propagating as guided within the waveguide layer structure based on refractive index differences in the pattern, wavelength of said radiation being substantially greater than said typical distances between neighboring inclusions in the array; and
 control arrangement operationally coupled to the uniaxially patterned region for controlling the propagation of the modes differentially, said control arrangement comprising a pumping device for pumping said at least one semiconductor layer, so as to render it as an amplifying medium for at least one of the modes of electromagnetic radiation with the wavelength being substantially greater than the typical distance between neighboring inclusions to propagate in said waveguide layer structure.

2. The device of claim 1, wherein said top cladding layer consists essentially of air.

3. The device of claim 1, further comprising a top resonant layer such that vertical coupling between said top resonant layer and said core layer is polarization dependent.

4. The device of claim 1, further comprising a bottom substrate such that leakage into said substrate, of electromagnetic radiation to propagate in said waveguide layer structure, is polarization dependent.

5. The device of claim 1, wherein said uniaxial pattern provides substantially equal optical confinement to transverse-electric and transverse-magnetic modes of electromagnetic radiation to propagate in said waveguide layer structure with wavelength substantially greater than said typical distances between the neighboring inclusions.

6. The device of claim 1, wherein said uniaxial pattern provides a desired ratio of modal gains between transverse-electric and transverse-magnetic modes of electromagnetic radiation to propagate in said waveguide layer structure.

7. The device of claim 1, wherein said two-dimension array of inclusions is a non-periodic array and possess no long range order.

8. The device of claim 7, wherein said uniaxially patterned region having the non-periodic array of inclusions further comprises an array of domains having first dielectric permittivity, said domains being embedded in layer material having second permittivity different from said first permittivity.

9. The device of claim 8, wherein said control arrangement comprises arrangement for changing refractive index contrast between said regions of first and second dielectric permittivity.

10. The device of claim 8, wherein said domains of first dielectric permittivity consist essentially of air pores.

11. The device of claim 8, wherein average separation between said domains of first dielectric permittivity is less than wavelength of electromagnetic radiation to propagate in said waveguide layer structure.

12. The device of claim 7, wherein area density of said uniaxially patterned layer including the non-periodic array of inclusions is varied laterally, so as to achieve a desired lateral waveguide pattern.

13. The device of claim 7, wherein optical properties of the waveguide layer structure formed with the non-periodic array of inclusions are defined substantially by the fraction of total volume of the waveguide layer structure occupied by the inclusions, said optical properties being independent of a long-range order of the inclusions.

* * * * *